(12) United States Patent
van Houtum et al.

(10) Patent No.: US 10,542,764 B2
(45) Date of Patent: Jan. 28, 2020

(54) CONFECTIONERY TREATMENT

(71) Applicant: Mars, Incorporated, McLean, VA (US)

(72) Inventors: Adrianus Johanus Anthonius van Houtum, Veghel (NL); Danielle Theodora Johanna Breuer, Veghel (NL)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 15/307,679

(22) PCT Filed: Apr. 16, 2015

(86) PCT No.: PCT/US2015/026177
§ 371 (c)(1),
(2) Date: Oct. 28, 2016

(87) PCT Pub. No.: WO2015/167814
PCT Pub. Date: Nov. 5, 2015

(65) Prior Publication Data
US 2017/0042176 A1     Feb. 16, 2017

(30) Foreign Application Priority Data
Apr. 28, 2014  (GB) .................................. 1407396.9

(51) Int. Cl.
A23G 1/54      (2006.01)
A23G 1/00      (2006.01)
A23G 1/50      (2006.01)

(52) U.S. Cl.
CPC ............ *A23G 1/54* (2013.01); *A23G 1/0006* (2013.01); *A23G 1/50* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 1,931,409 A | 10/1933 | Humphrey | |
| 2,353,594 A | 7/1944 | Seagren | |
| 2,487,931 A | 11/1949 | Latamer | |
| (Continued) | | | |

FOREIGN PATENT DOCUMENTS

| | | |
|---|---|---|
| CH | 409603 | 3/1966 |
| CH | 410607 | 3/1966 |
| (Continued) | | |

OTHER PUBLICATIONS

Frederick et al "Get Rid of White Spots on Chocolate" pp. 1-8, posts of 2012 and earlier http://www.chocolate-candy-mall.com/get-rid-of-white-spots-on-chocolate.html.*
(Continued)

*Primary Examiner* — Kelly J Bekker
(74) *Attorney, Agent, or Firm* — Fish & Richardson P.C.

(57) ABSTRACT

A method for reducing or removing scuff marks on the surface of a confectionery product, said method comprising subjecting said product to a heat treatment, for example in a heating chamber or by application or a hot gas or infra-red blower, for a period of time and at a temperature which is sufficient to remove scuff marks but insufficient to de-temper or cause heat damage to the product.

10 Claims, 6 Drawing Sheets

(56) References Cited

U.S. PATENT DOCUMENTS

| | | |
|---|---|---|
| 2,760,867 A | 8/1956 | Kempf et al. |
| 3,218,174 A | 11/1965 | Gian-Franco et al. |
| 3,229,647 A | 1/1966 | Von Drachenfe et al. |
| 3,270,040 A | 8/1966 | Bradshaw et al. |
| 3,648,625 A | 3/1972 | Glass |
| 3,692,451 A | 9/1972 | Sollich |
| 3,852,494 A | 12/1974 | Williamson |
| 3,935,321 A | 1/1976 | Sakler et al. |
| 3,943,842 A | 3/1976 | Bills et al. |
| 4,081,559 A | 3/1978 | Jeffrey et al. |
| 4,353,927 A | 10/1982 | Lovercheck |
| 4,369,200 A | 1/1983 | Iwao et al. |
| 4,426,402 A | 1/1984 | Kaupert |
| 4,431,678 A | 2/1984 | Sollich |
| 4,446,166 A | 5/1984 | Giddey et al. |
| 4,543,262 A | 9/1985 | Michnowski |
| 4,545,997 A | 10/1985 | Wong et al. |
| 4,563,363 A | 1/1986 | Yoon |
| 4,572,835 A | 2/1986 | Hachiya et al. |
| 4,832,971 A | 5/1989 | Michnowski |
| 4,859,475 A | 8/1989 | Michnowski |
| 4,859,483 A | 8/1989 | Sollich |
| 4,865,856 A | 9/1989 | Groes |
| 4,877,636 A | 10/1989 | Koyano et al. |
| 4,888,196 A | 12/1989 | Ehrman et al. |
| 4,910,037 A | 3/1990 | Sagi et al. |
| 5,023,102 A | 6/1991 | Given, Jr. et al. |
| 5,023,106 A | 6/1991 | Ehrman et al. |
| 5,032,418 A | 7/1991 | Sollich |
| 5,108,769 A | 4/1992 | Kincs |
| 5,188,853 A | 2/1993 | Sollich |
| 5,188,858 A | 2/1993 | Stipp |
| 5,264,234 A | 11/1993 | Windhab et al. |
| 5,266,348 A | 11/1993 | Zumbe et al. |
| 5,271,950 A | 12/1993 | Yamaguchi |
| 5,275,835 A | 1/1994 | Masterson et al. |
| 5,342,644 A | 8/1994 | Cain |
| 5,354,572 A | 10/1994 | Miller et al. |
| 5,464,649 A | 11/1995 | St John et al. |
| 5,514,390 A | 5/1996 | Aasted |
| 5,532,021 A | 7/1996 | Kida et al. |
| 5,589,216 A | 12/1996 | Guskey et al. |
| 5,599,574 A | 2/1997 | Guskey et al. |
| 5,635,230 A | 6/1997 | Aasted |
| 5,705,217 A | 1/1998 | Aasted |
| 5,709,896 A | 1/1998 | Hartigan et al. |
| 6,001,404 A | 12/1999 | Mochizuki |
| 6,074,681 A | 6/2000 | Nakai |
| 6,217,927 B1 | 4/2001 | Suttle et al. |
| 6,419,970 B1 | 7/2002 | Willcocks et al. |
| 7,556,493 B2 | 7/2009 | Suttle et al. |
| 8,056,470 B2 | 11/2011 | Blasing et al. |
| 8,425,961 B2 | 4/2013 | Turek |
| 2006/0188622 A1 | 8/2006 | Suttle et al. |
| 2007/0259070 A1 | 11/2007 | Song et al. |
| 2009/0183642 A1 | 7/2009 | Blasing |
| 2009/0246330 A1 | 10/2009 | Zhong et al. |
| 2015/0289535 A1 | 10/2015 | Kinta et al. |

FOREIGN PATENT DOCUMENTS

| | | | |
|---|---|---|---|
| DE | 202005012336 | 11/2005 | |
| GB | 620417 | 3/1949 | |
| GB | 1219996 | 1/1971 | |
| GB | 2265460 | 9/1993 | |
| JP | S55114261 | 9/1980 | |
| JP | S58201943 | 11/1983 | |
| JP | H02191502 | 7/1990 | |
| WO | 9407375 | 4/1994 | |
| WO | WO-2007112077 A2 * | 10/2007 | ............. A23G 1/305 |

OTHER PUBLICATIONS

Tom "What's the Best Clothes Streamer to Use At Home" http://www.tomsreviews.co.uk/utility-room/best-clothes-steamer-reviews-home/ pp. 1-2 Jan. 2017.*

Efficiency Partnership Flex Your Power, Aug. 2006 p. 9 https://www.pge.com/includes/docs/pdfs/mybusiness/energysavingsrebates/incentivesbyindustry/foodservices/Boosting_Restaurant_Profits_with_Energy_Efficiency.pdf.*

Minifie Chocolate, Cocoa and Confectionery 3rd Edition pp. 174, 657, 658, 662, 709-712, 738, 740 and 741 Chapman and Hall 1989.*

Beckett, "Industrial Chocolate Manufacture and Use", 1994, p. 156.

Dimick, "Principles of Cocoa Butter Crystallization", 45th PMCA Production Conference, 1991, pp. 15-20.

Koch, "Some Thoughts on the Gloss of Chocolates", Confectionery Production, May 978, pp. 182, 184 and 254.

Korfhage, AACT, Atlanta Section, Feb. 24, 1967, pp. 11-14.

Minifie, "Chocolate, Cocoa and Confectionery: Science and Technology", 1999, 3rd Edition, pp. 195, 212-221, 578-580 and 647.

Minifie, "Chocolate, Cocoa and Confectionery: Science and Technology", 2nd ed. AVI Pub., pp. 142-174, 1980.

Seguine, "It Ain't Over Until . . .", The Manufacturing Confectioner, Jun. 1995, presented at the Penn. Manufacturing confectioner's Assoc. 49th Annual Conference, pp. 55-58.

Whetstone, "Moulds and Moulding Examples and Techniques", Jun. 1996, pp. 93-99, The Manufacturing Confectioner.

Wille, et al., "Polymoprhism of Cocoa Butter", J. Amer. Oil. Chem. Society, vol. 43 (1966), pp. 491-496.

* cited by examiner (A)

(B)

(C)

(D)

CONFECTIONERY TREATMENT

CROSS-REFERENCE TO RELATED APPLICATIONS

This application is a 371 National Stage filing of International Application Serial No. PCT/US2015/026177 filed Apr. 16, 2015, which claims priority to GB Application No. 1407396.9 filed Apr. 28, 2014, both of which are hereby incorporated by reference herein in their entirety.

The present invention relates to a method for treating confectionery in particular chocolate, in order to reduce or eliminate unwanted marks caused by friction or 'scuffing' of the surface of the chocolate.

BACKGROUND OF THE INVENTION

The appearance of confectionery products is very important to the appeal of the product to the consumer and thus to the success of the product in the market place. Confectionery such as chocolate may be prone to 'scuffing' during procedures such as weighing or packaging employed during production. In these instances, unsightly white marks appear on the surface of the chocolate as a result, for example, of abrasion to the surface of the confectionery item that may occur during the production or packaging process, or when they are in contact with each other. These marks are particularly apparent on brown chocolate which may be dark, milk or plain chocolate Processes in which chocolate is subjected to rapid cooling and then subsequently rewarmed to improve thermal robustness or prevent the formation of bloom are known for example from U.S. Pat. No. 6,419,970 and EP-A-0390408. However the applicants have found that a heat treatment alone can be used to remove scruff marks which have formed on the chocolate.

SUMMARY OF THE INVENTION

According to the present invention there is provided a method for reducing or removing scuff marks on the surface of a confectionery product, said method comprising subjecting said product to a heat treatment for a period of time and at a temperature which is sufficient to remove scuff marks but insufficient to de-temper or cause heat damage to the product.

As used herein, the expression 'de-temper' refers to a process wherein a product tempering process is reversed, leading to product in which the structures induced during tempering are broken down. In particular, a product such as chocolate is subject to a tempering process during manufacture in order to produce a product with desirable characteristics, in particular a glossy appearance and firm 'snappy' texture.

It is achieved by ensuring that fats present in the product, such as cocoa butter used in most chocolate, crystallises in the optimum way. In the case of cocoa butter, this means that it is present predominantly in the stable Type V crystalline form. Thus, in the case of a cocoa butter containing product, a 'de-temper' process is one in which the levels of Type V crystalline form is reduced, and replaced by other less stable crystal forms.

The applicants have found that it is possible to reduce or remove scuff marks from confectionery items simply by a controlled heat treatment. This result is surprising since the application of heat after manufacture of a confectionery product is generally undesirable as it may lead to de-tempering or heat damage. For instance, excess heat may least to the disappearance of the gloss of the product, so that the confectionery item acquires a dull, unappealing appearance. Alternatively, discoloration of the surface may occur, or a white layer or sediment may form on the surface.

However, the applicants have found that heat treatment, either by incubation at a relatively moderate temperature for a quite prolonged period or a relatively rapid treatment at a high temperature, can be highly effective at removing scuff marks without any of these drawbacks. Furthermore, the heat treatment does not appear to impact significantly on the shelf life of the treated product.

Without being bound by theory, the applicants speculate that it may be due to a localised melting of the unstable polymorphic forms of the fat crystals such as cocoa butter crystals types I-IV present in the scuffing. These polymorphic forms have melting points in the range of from 17.3-27.3° C. By heating the chocolate in a controlled way as described herein, it appears that these forms only will be melted off, and the stable type V cocoa butter crystals will be unaffected. Furthermore, the normal crystallization process isn't affected by the treatment and so the cocoa butter crystals reform in the stable Type V polymorph form. When the crystallization is finalised the desired, strong and robust crystallization pattern of well-tempered chocolate is formed, which is highly desirable from an appearance view point as it forms a hard, glossy surface that consumers like. Effectively therefore, the method the applicants have developed doesn't influence the normal tempering of the chocolate, but it is effective as it does remove/reduce scuffing existing on the surface of the chocolate The precise time and temperatures required to remove the scuff marks in any particular case will vary depending upon the nature of the confectionery product, and can be determined by the skilled person using routine methods. In all cases however, the surface of the confectionery item and in particular the chocolate must not reach the melting point of the Type V crystals, which, in the case of pure cacao butter, is 33.8° C. However, the precise melting point will vary depending upon the particular recipe used. Generally it may be lower than 33.8° C. where more ingredients are mixed with the cacao butter.

In a particular embodiment, the confectionery product comprises chocolate, which may be light (white) or dark (milk or plain) chocolate, which is present at least on the outside of the product. Alternatively however, the product may comprise other types of confectionery including fat or sugar based products such as fudge, toffee and caramel or compound chocolate (made with fat other than cocoa butter) which is sometimes known as imitation chocolate, and in particular any containing fats such as cocoa butter or cocoa butter equivalents and thus are subject to the problems arising as a result of polymorphic forms. It is also possible that the confectionery product has for example a wax or sugar coating that may be subject to scuffing, applied to the surface.

As used herein, the expression 'chocolate' refers to compositions based upon cocoa products in particular, cocoa butter or cocoa butter equivalents, as well as optionally cocoa solids and/or cocoa liquor. Typically chocolate will comprise one or more additional ingredients such as milk, milk powder, condensed milk and sugar such as sucrose or glucose.

In a particular embodiment, the heat treatment may comprise applying infra-red rays or a blast of hot gas, and in particular hot air directly to the surface of the product for a short period of time. This may be effected using for instance, a hot air blower or similar, which is applied manually to the products. The blower is held above the product for a period of time sufficient to ensure that scuff marks are reduced or removed.

Alternatively, the treatment may be automated in the production of the product, for example by passing a production line or conveyor belt carrying product under a hot air blower.

The blower is suitably arranged above the product at a distance which is sufficient to produce the desired result without burning or singeing of the product. This distance will vary depending upon factors such as the operating parameters such as the temperature and speed of the hot air delivered, as well as the precise nature of the product and the degree of scuffing present. However, typically, the blower will be arranged from 15-50 cm above the product, for example from 20-30 cm above the product such as at about 25 cm above the product.

In a particular embodiment, the heat treatment is applied to the product as it is allowed to fall, in particular into a packaging receptacle such as a packaging pouch. In this instance, the heat treatment may be applied to the product as it emerges from a weighing machine, during a fall into the pouch. Generally, it will be allowed to fall through a vessel or 'fall-pipe'. In such cases, hot air or infra-red is applied to the product as it falls through the pipe. Suitably the surfaces or walls of the pipe are kept at a low temperature in order to prevent product from adhering or sticking to the surface of the pipes. This may be achieved for example by providing a cold water jacket around the pipe.

The temperature of the gas such as air applied to the product during heat treatments of this type may be high, for example from 40-150° C., for example at from 40-80° C. such as about 65° C. However, application times are relatively short, for example less than 10 seconds, such as from 5 milliseconds to 1 second, for example from 20-80 milliseconds depending upon factors such as the nature of the product and the extent of the scuffing that is present as well as the temperature applied and the manner in which it is applied. For instance, if the heat treatment is applied while the product is falling or in a 'fall-pipe' as described above, the length of time it is exposed to the heat treatment will necessarily be short and therefore a temperature at the higher end of the range provide above may be preferred.

Thus as described above, the heat treatment is applied as a short 'burst' which rapidly reduces or eliminates scuff marks without de-tempering or otherwise damaging or modifying the product. The applicants have surprisingly found that following such treatment, scuff marks on the surface are reduced or eliminated. Such rapid heat treatment doesn't appear to harm the surface of the product, and does not impact or influence the cocoa butter at the surface which retains or forming the desirable Type V polymorphic form.

During such treatments, the surface of the chocolate itself should preferably not exceed 33° although it may suitably reach temperatures of about 32° C. The temperature of the surrounding support for confectionery, such as the conveyor belt that forms part of the production line, may reach higher temperatures, for example of up to 60° C.

If necessary or required, the product may be subject to a cooling procedure immediately after the heat treatment, but in general, the applicants have found that this is unnecessary and the treated products maintain a desirable appearance.

Treatment of this type may be carried out at any time during the production process, where scuffing has or is likely to have occurred. In particular however, the incubation is carried out at the end of the production process, just prior to final packaging, so that no or minimal further scuffing is likely to occur.

Alternatively, the heat treatment of the invention may be effected by incubating the products in a heater cabinet. In this case, a relatively mild heat may be applied, for example of from 27-40° C., for example of from 28-29° C. The incubation time will be sufficient to ensure that the scuff marks are removed, for instance from 0.5-48 hours, such as from 2-24 hours. The heater cabinet may comprise a hot climate cabinet or alternatively, may be an infra-red heater.

Incubation in this way may also be carried out at any time during the production process, where scuffing has or is likely to have occurred. In particular however, the incubation is carried out at the end of the production process, when all the packaging, including any wrappers, boxes of other containers, has been applied, so that no further scuffing is likely to occur.

This embodiment is convenient in that the heat treatment may be applied with relatively little user input, other than to load and unload the product from the heat treatment chamber.

Products treated in accordance with the method of the invention show reduced or no 'scuff' marks and therefore maintain a normal appearance which, in the case of chocolate is a glossy appearance that is more appealing to the consumer. Furthermore, the shelf life of the product remains substantially unaffected by the treatment.

Apparatus and in particular heating chambers, infra-red heaters or hot air blowers may be programmed to carry out the method of the invention automatically. Such apparatus, when programmed in this way, forms a further aspect of the invention.

DETAILED DESCRIPTION OF THE INVENTION

The invention will now be particularly described by way of example. However, it will be apparent to one skilled in the art that the specific details are not required in order to practice the invention. The following descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

The examples refer to the accompanying drawings in which.

Figure 4:
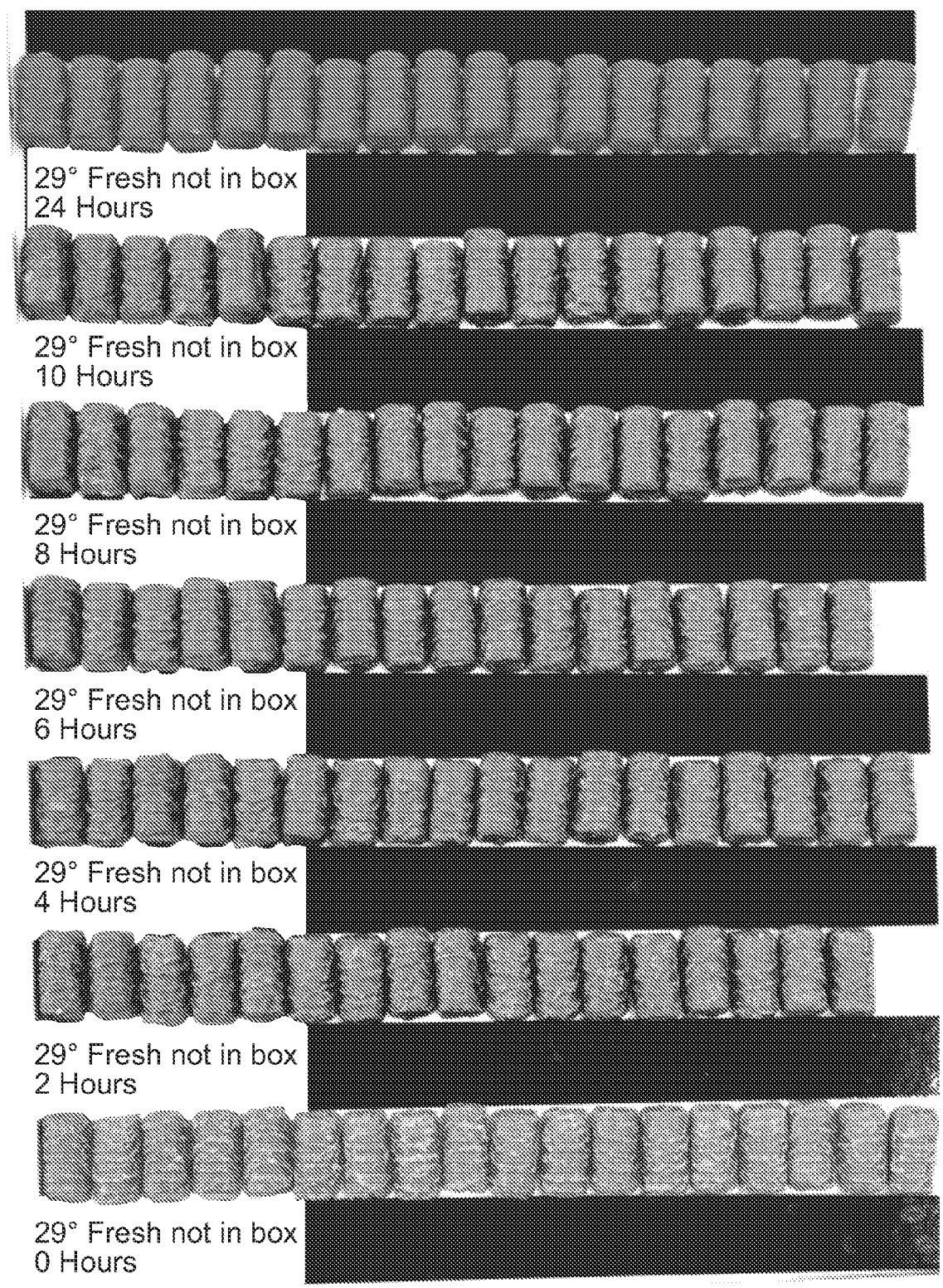
Figure 4:
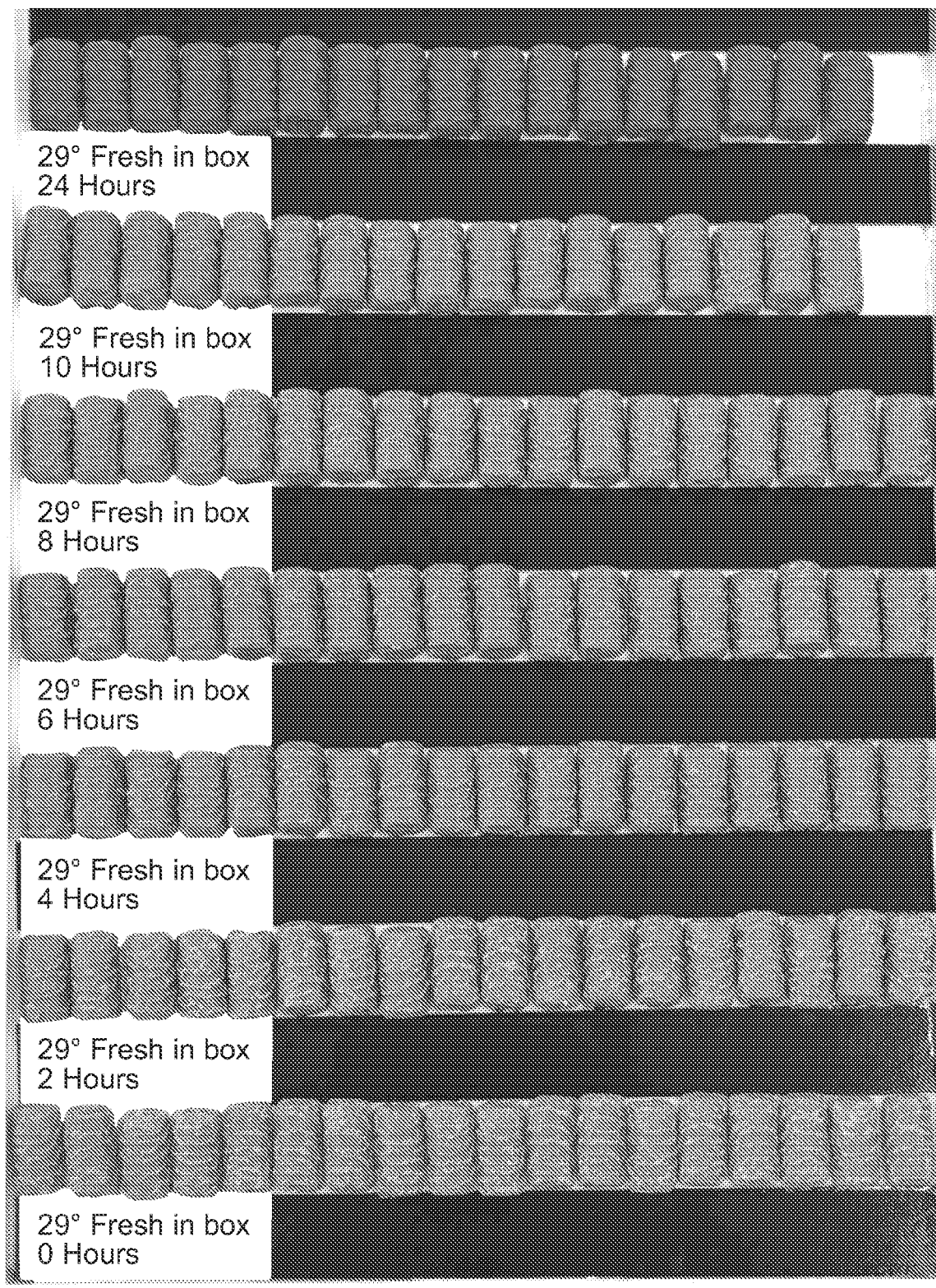
Figure 4:
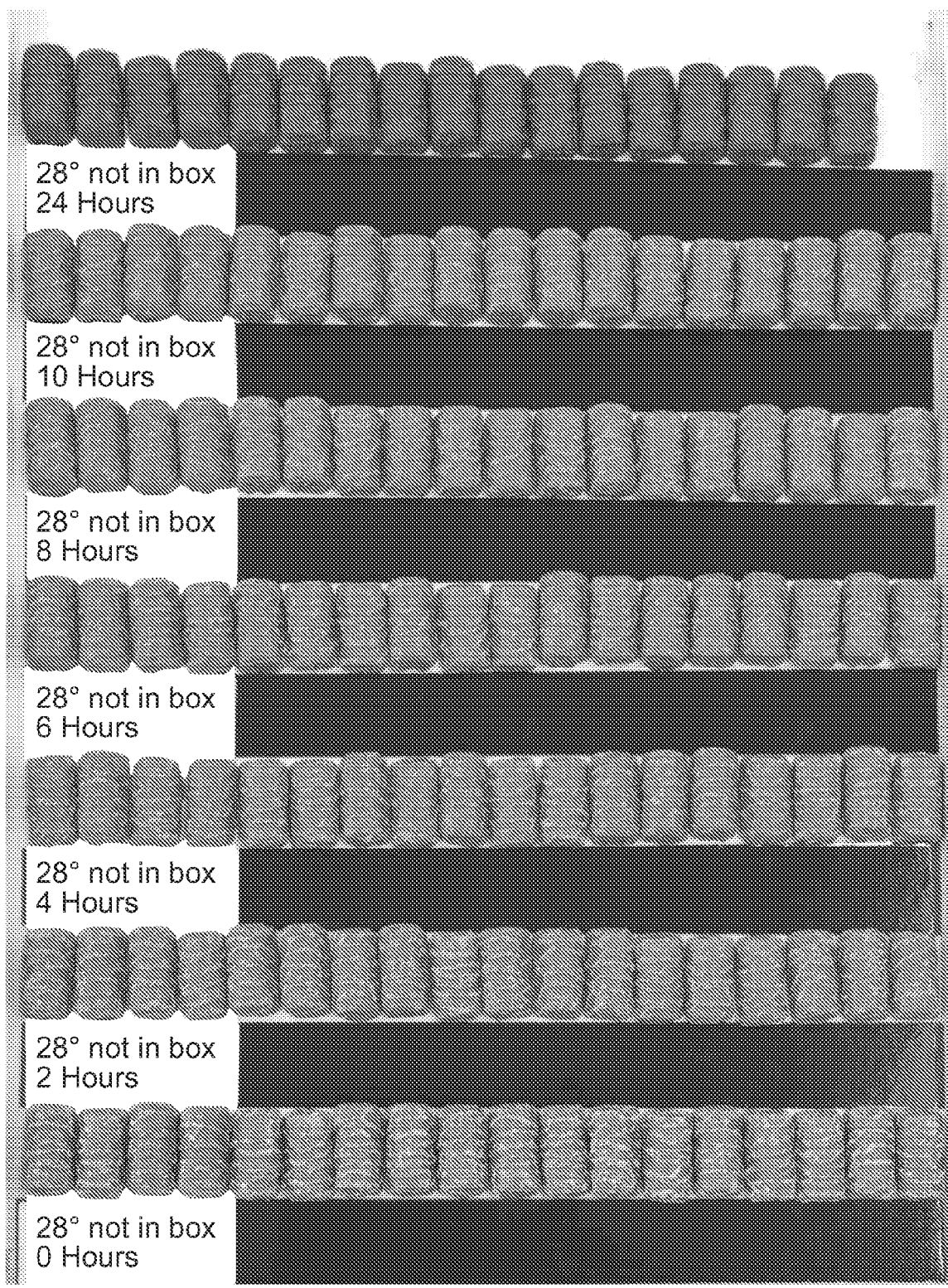
Figure 4:
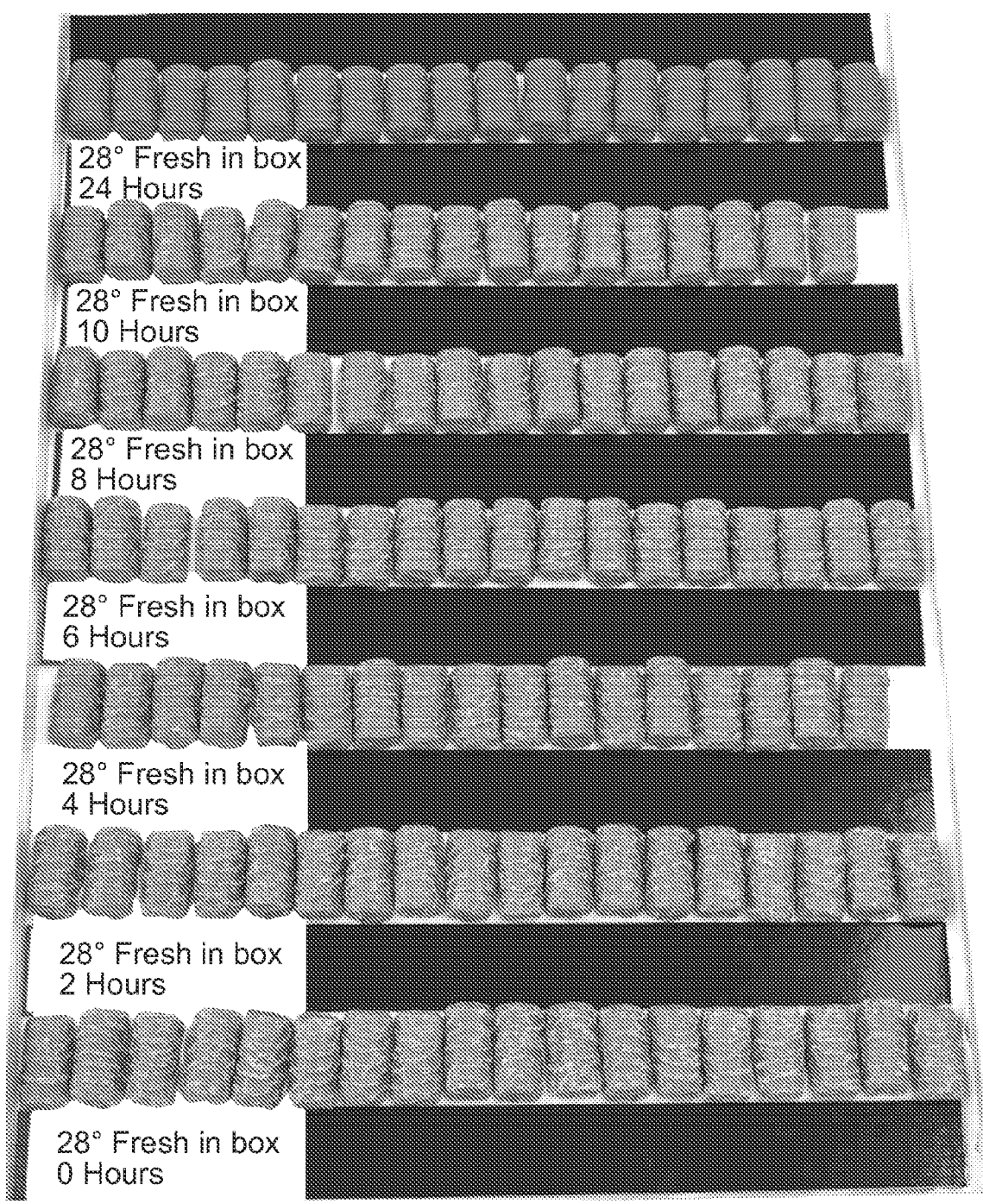

FIG. 4 shows the results of (A) heat treatment in accordance with the invention of chocolate bars held loose in pouches in a hot climate cabinet for various periods of time at 29° C. and (B) are the results for similar products held in a box, and (C) heat treatment in accordance with the invention of chocolate bars held loose in pouches in a hot climate cabinet for various periods of time at 28° C. and (D) are the results for similar products held in a box.

EXAMPLE 1

Hot Air Treatment

A row of 13 individual bite-size chocolate bars (Twix® miniatures), each of which was severely scuffed, were spaced on a surface in a line. A hot air blower with a downwardly directed air flowed was manually moved over the entire row of chocolates and back again at a distance of about 25 cm above the chocolate surface. The entire operation was completed in 11.2 seconds, suggesting that each bar was exposed to the hot air for less than 1 second.

Figure 1:
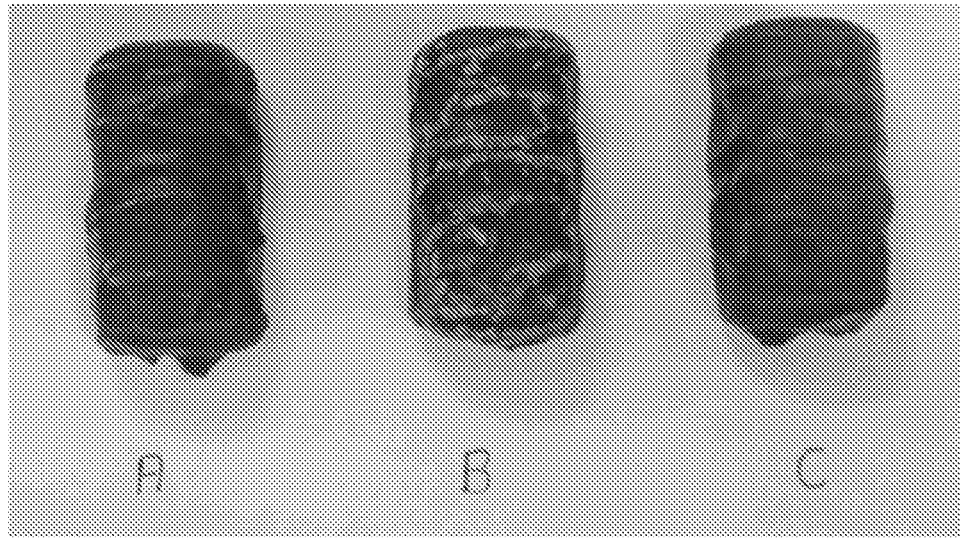
FIG. 1 shows a product which is (A) unscuffed, (B) scuffed and (C) a previously scuffed product which has been treated in accordance with the invention.

Reduction in scuffing was significant and immediate. The results are illustrated in FIG. 1 in which (A) shows a product which is un-scuffed, (B) illustrates the scuffing that may occur during a production process, and (C) shows a product which had been scuffed but treated as described above. The treated product has a similar appearance to the un-scuffed product.

EXAMPLE 2

Apparatus for Carrying Out Hot Air Treatment

Figure 2:
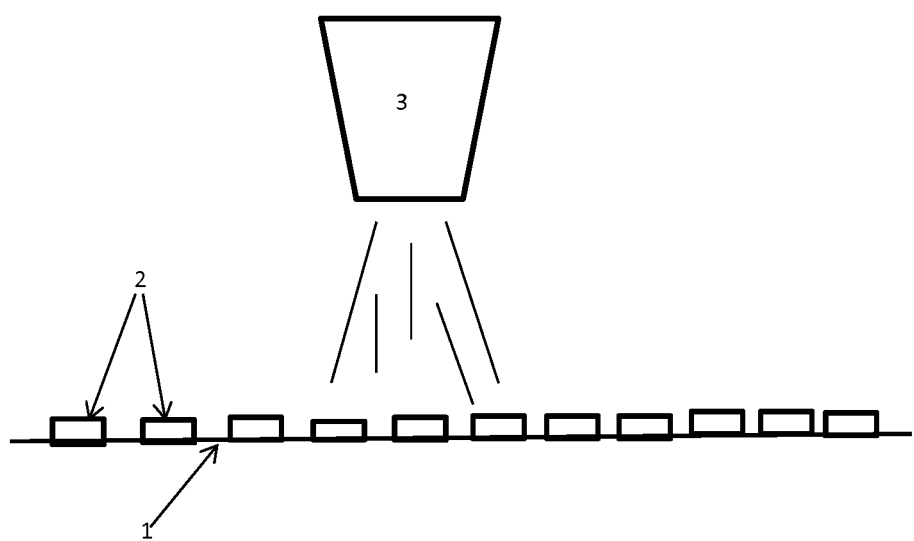
FIG. 2 illustrates an arrangement showing a hot air treatment stage of a production line which is arranged to effect the method of the invention.

Apparatus to carry out the process described in Example 1 on an industrial scale is shown in FIG. 2. In this embodiment, a transport or conveyor belt (1), arranged to carry confectionery items (2), passes below a hot air blower (3). The blower (3) at a speed of is arranged approximately 25 cm above the belt (1) and is arranged to supply a flow of air at a temperature of 65° C. The conveyer belt (1) is moved under the blower (3) at a rate of 0.8 metres/minute, meaning that each item (2) is exposed to the hot air stream for a period of about 6 seconds. As a result, the temperature of the surface of the items reaches approximately 32° C.

EXAMPLE 3

Alternative Apparatus for Carrying Out Hot Air Treatment

Figure 3:
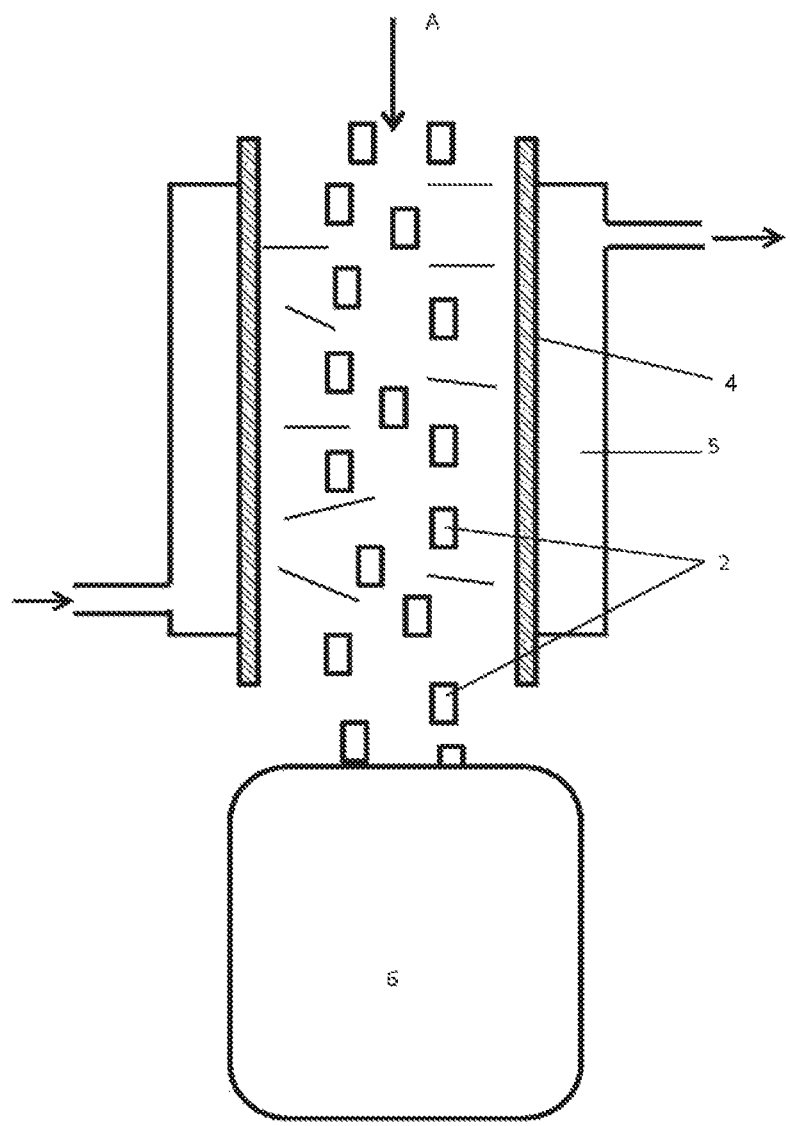
FIG. 3 shows an alternative arrangement that may be used to apply a hot air treatment.

Apparatus to carry out a heat treatment in accordance with the invention is shown in FIG. 3. In this embodiment, confectionery items (2) leaving a weighing machine (not shown), are allowed to drop in the direction of arrow A through a fall tube (4). A cold water jacket (5) is provided around the tube (4) and cold water is passed through it in the direction of the arrows. A hot air blower or infra-red heater (not shown) is arranged to apply heat directly onto the confectionery items (2) as they fall through the tube (4). During this time, scuff marks are removed.

The items (2) are collected directly in a packaging pouch (6).

EXAMPLE 4

Hot Climate Cabinet Treatment

Packs comprising a plurality of individual bite-size chocolate bars (Twix® miniatures), each of which was severely scuffed, were packed together in a pouch and placed in a Hot Climate cabinet and retained at either 27° C. or 29° C. for a period of 24 hours. At the end of this time, the bars were examined visually for scuffs.

The bars held at 27° C. showed a 50% reduction in scuff marks, which the bars held at 29° C. showed a 95% reduction in scuffs.

EXAMPLE 5

Hot Climate Cabinet/Shelf Life Studies

Samples of the bars as described in Example 3 were packaged loose in pouches. In some cases, the pouches were themselves e packaged in a carton or show box. All the bars were significantly damaged and therefore showed a lot of scuff marks.

These were held in the hot cabinet climate at temperatures of 28° C., 28.5° C. and 29° C. for a period of 2, 4, 6, 8, 10 and 24 hours. A control group was not placed in the cabinet (0 hours). At the end of this procedure, bars were removed from the packages and examined for scuffing. All heat treated bars showed significantly reduced scuffing, whereas the condition of the control group was unchanged.

The results at 29° C. and 28° C. are illustrated in FIG. 4. As can be seen, the amount of scuffing was lower, the longer the samples had been held in the cabinet. At 29° C., a reduction in scuffing occurred earlier during the process.

The bars were then subject to a 9 week ageing study. There appeared to be no adverse effect on the shelf life of any of the bars.

The invention claimed is:

1. A method for reducing or removing scuff marks on the surface of a confectionery product comprising chocolate or compound chocolate, said method comprising:
    identifying a confectionery product having one or more scuff marks on a surface thereof;
    and
    subjecting said confectionery product to a controlled heat treatment for a period of time and at a temperature which is sufficient to remove scuff marks but insufficient to de-temper or cause heat damage to the product; whereby the confectionery product is packaged and the heat treatment comprises infra-red heat or a blast of hot air at a temperature of about 27° C. to about 40° C. for about 0.5 hours to about 48 hours.

2. The method of claim 1, wherein the confectionery product further comprises fudge, toffee, or caramel.

3. The method of claim 2, wherein the chocolate is present in the form of a coating or layer on the outside of the confectionery product.

4. The method of claim 1, wherein said confectionery product is a chocolate, and the temperature of the surface of said chocolate does not exceed about 33° C. during said heat treatment.

5. The method of claim 1, wherein the confectionery product is packaged and applying a heat treatment consisting essentially of infra-red heat or a blast of hot air at a temperature of about 27° C. to about 40° C. for about 0.5 hours to about 48 hours to said packaged confectionery product wherein the heat treatment is carried out by incubating the confectionery product in a heater cabinet.

6. The method of claim 5, wherein said temperature is about 28° C. to about 29° C.

7. The method of claim 5, wherein said heat treatment is applied for about 2 hours to about 24 hours.

8. The method of claim 6, wherein the confectionery product exhibits a glossy appearance after heat treatment.

9. A method for reducing or removing scuff marks on the surface of a confectionery product comprising chocolate or compound chocolate, said method comprising:
    identifying a confectionery product having one or more scuff marks on a surface thereof;
    subjecting said confectionery product to a controlled heat treatment for a period of time and at a temperature which is sufficient to remove scuff marks but insufficient to de-temper or cause heat damage to the product;
    the heat treatment consisting essentially of applying infra-red heat or a blast of hot gas to said confectionery product at a temperature of about 27° C. to about 40° C. for about 0.5 hours to about 48 hours.

10. The method of claim 9, wherein the shelf life of the confectionery product remains unaffected by the heat treatment.

* * * * *